United States Patent [19]
Henricks

[11] Patent Number: 4,810,028
[45] Date of Patent: Mar. 7, 1989

[54] CRASHABLE AUTOMOBILE FRAME

[76] Inventor: William J. Henricks, Rte. 4, Franklin St., Buffalo, Minn. 55313

[21] Appl. No.: 66,706

[22] Filed: Jun. 25, 1987

[51] Int. Cl.$^4$ .............................................. B60R 19/00
[52] U.S. Cl. .................................. 296/188; 296/185; 296/194; 296/195; 296/203; 293/42
[58] Field of Search ............... 296/185, 188, 203, 204, 296/205, 193, 194, 195, 199, 155; 293/42, 48

[56] References Cited

U.S. PATENT DOCUMENTS

| | | | |
|---|---|---|---|
| 2,068,715 | 7/1934 | Stevens | 296/185 |
| 2,078,679 | 1/1938 | Golphin | 293/48 |
| 2,354,700 | 8/1944 | Pezzano | 293/57 |
| 2,903,295 | 9/1959 | Brahmstedt | 296/1 |
| 2,988,397 | 9/1956 | Brueder | 296/196 |
| 4,045,075 | 8/1977 | Dulver | 296/1.5 X |
| 4,684,167 | 8/1987 | Newmayer | 296/146 X |

FOREIGN PATENT DOCUMENTS

| | | | |
|---|---|---|---|
| 748379 | 4/1933 | France | 296/205 |
| 935239 | 2/1948 | France | 296/188 |

OTHER PUBLICATIONS

Automotive Parts and Accessories, J. C. Whitney and Co., 1982, p. 250, Catalog No. 422D.

Primary Examiner—James B. Marbert
Assistant Examiner—Brian Sells
Attorney, Agent, or Firm—Steven E. Kahm

[57] ABSTRACT

A vehicle having a frame designed to reduce the damage caused by collisions between vehicles. The design of the frame has a cone shaped front and rear, with the point of the cone low to the ground to get under and lift the other vehicle in the event the front or rear of the vehicle makes contact with a conventional vehicle. If two vehicles of this design meet front to front or front to rear, the cone shape promotes glancability so the vehicles will glance off of one another rather that smash each other. The design of this vehicle includes an oval cross section, therefore if a conventional vehicle hits the side of the invention it will hit on the curved part of the side of the vehicle at the main chassis beam which is very strong. The curved part of the frame will promote the vehicle being pushed up tending to roll it over thus absorbing part of the impact as the conventional vehicle tends to have its front end pushed into the ground by being under the curved part of the inventions frame.

1 Claim, 13 Drawing Sheets

FIG.14 ical view of the invention taken at the center of the vehicle. It shows a rounded, oval shaped cross section which promotes rolling of the

CRASHABLE AUTOMOBILE FRAME

BACKGROUND OF THE INVENTION

The invention is in the field of automobile safety. Each year in the United States thousands of people are needlessly killed or severely injured in car accidents because cars are not built to be sufficiently crashable. The typical car manufactured today has a rectangular frame. In a crash situation between two such vehicles one flat side hits another flat side. The frames absorb the impact damaging the frame. The quick deacceleration of the vehicles puts a large force on the passengers in the vehicle and frequently kills or severely injures them.

BRIEF SUMMARY OF THE INVENTION

The Applicant has invented a car frame that promotes glancablility. The frame design also promotes the transfer of kinetic energy of moving vehicles into potential energy in a collision between a conventional car and the invention by lifting the conventional car rather than having the frame absorb the impact. In a front to side impact between two of vehicles employing the Applicant's design, the car hit on its side, would be lifted or rolled over, thus absorbing the impact in the form of kinetic energy. In front to front or front to rear collisions between two of Applicant's vehicles the design promotes glancability so that the vehicles bounce off of one another rather than absorb the impact which causes damage and injuries.

If all cars adopted Applicant's design, damage to vehicles would be minimized and injuries would be greatly reduced. The Applicant's design would also greatly reduce injuries in collisions with conventionally designed cars and with other objects.

BRIEF DESCRIPTION OF THE DRAWINGS

FIG. 11 is a is a front to front or front to tail view of a collision between two vehicles of this design.

DESCRIPTION OF THE PREFERRED EMBODIMENTS

Figure 1:
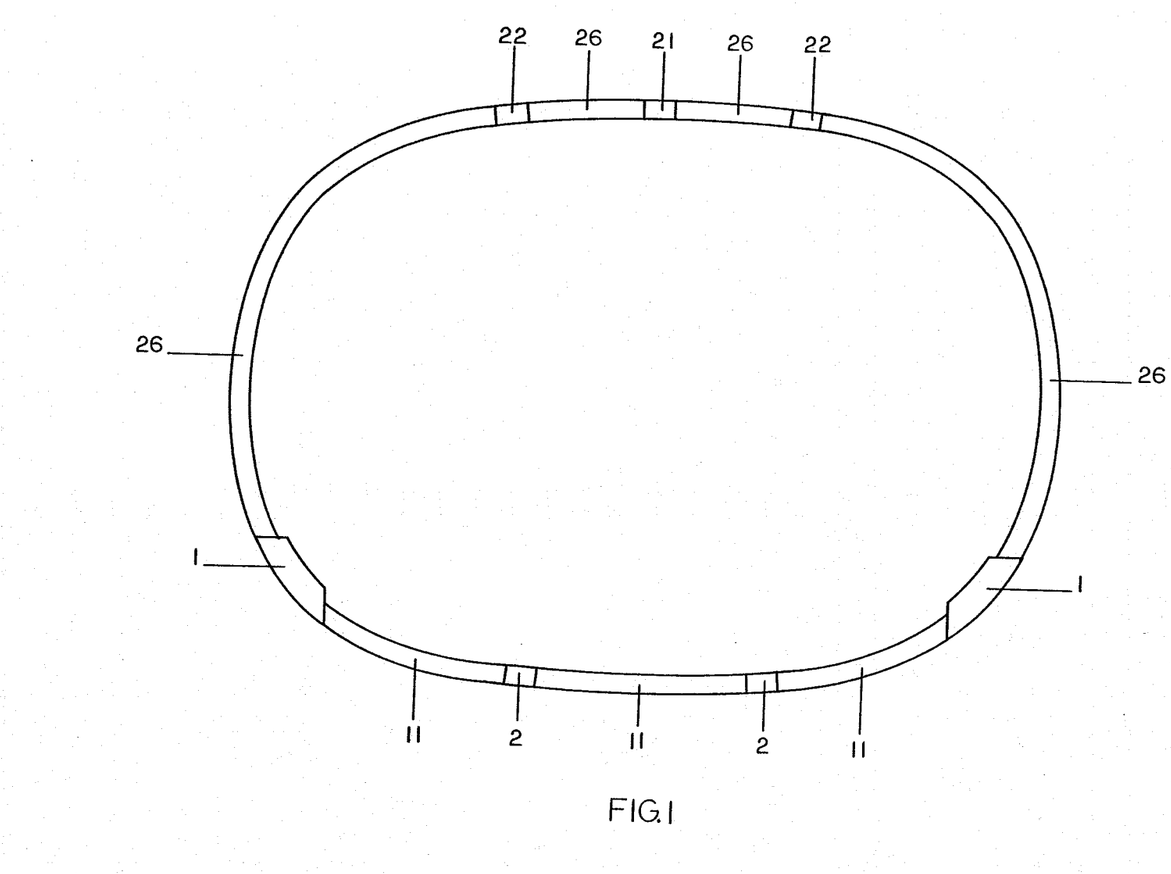
FIG. 1 is a cross sectional view taken at the center of the car showing the rounded rollable nature of the car body.
Figure 12:
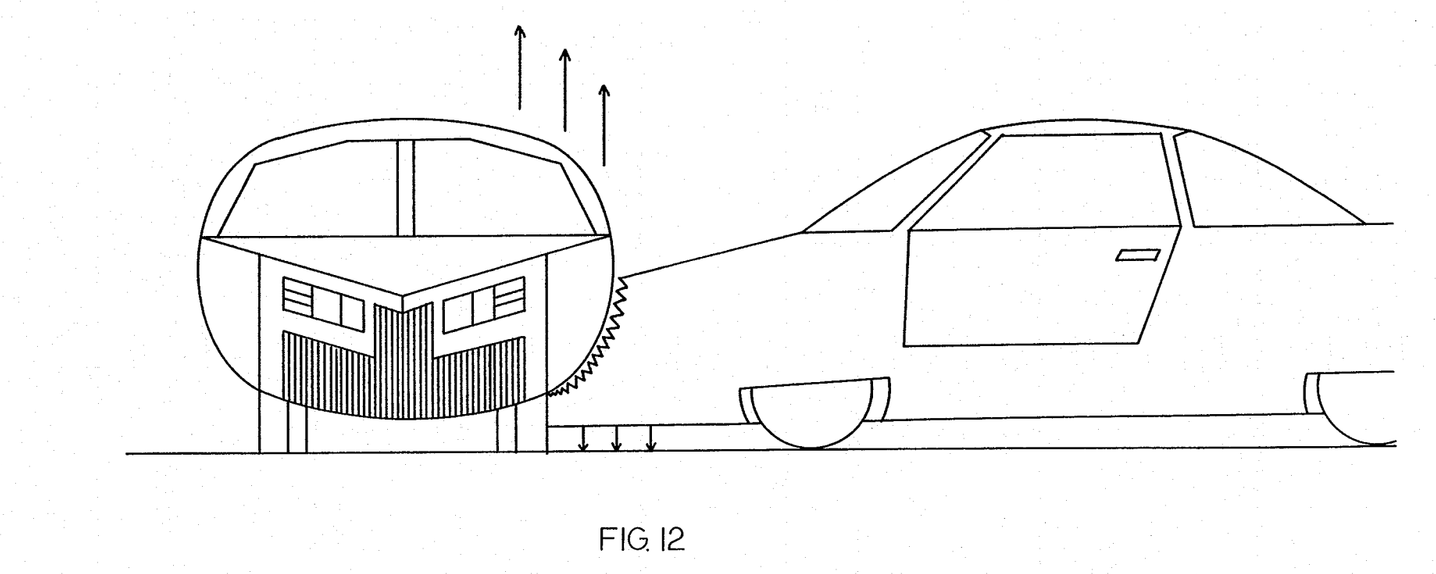
FIG. 12 is a front to side view of a collision between two vehicles of this design.
Figure 13:
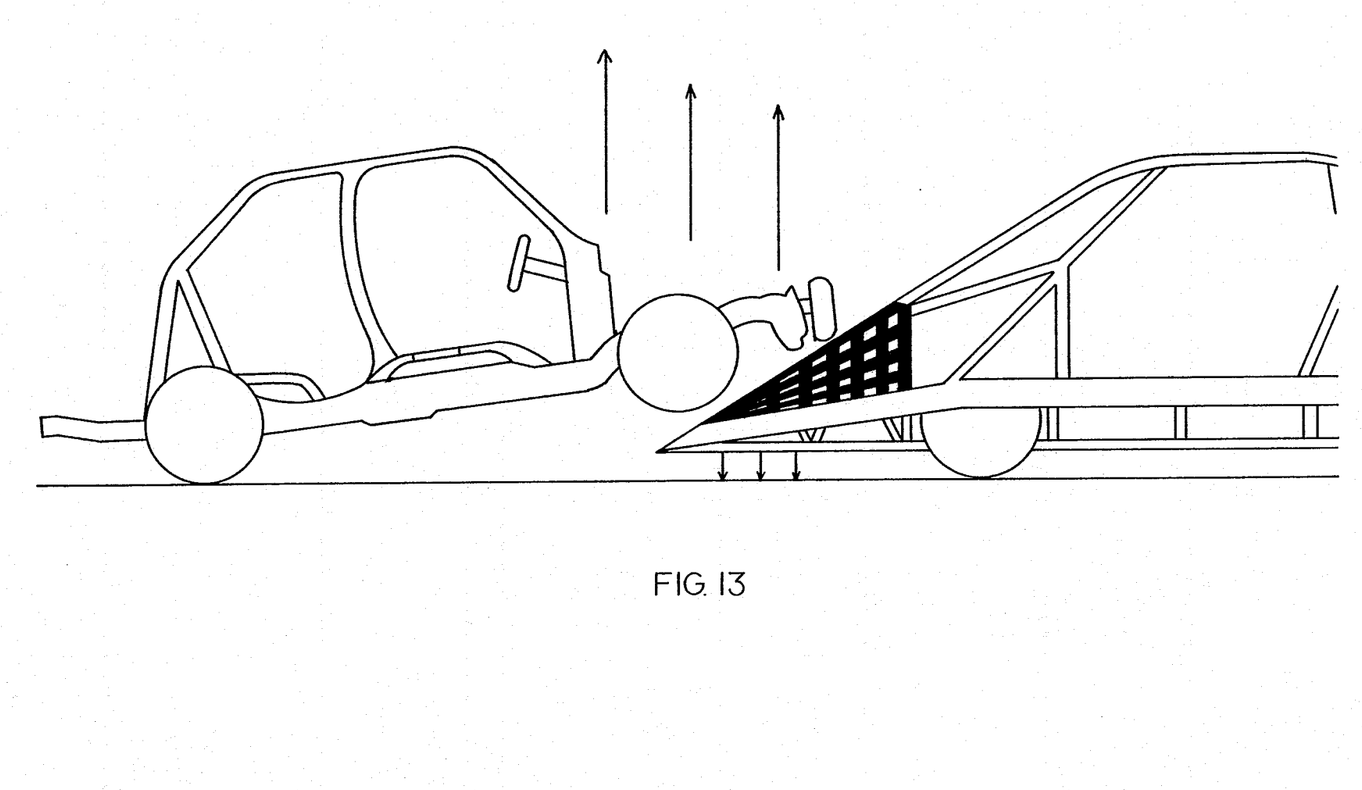
FIG. 13 is a side view of a front to front collision between a conventional frame car and Applicant's frame car.

FIG. 1 shows a cross sectional view of the invention taken at the center of the vehicle. It shows a rounded, oval shaped cross section which promotes rolling of the vehicle to absorb impacts from the side as shown in FIG. 12.

FIG. 1 shows the main chassis beams 1. There is one main chassis beam on each side of the vehicle. These beams are of a strong material to deflect impacts without being bent. They are placed on the outside edges of the vehicle at a height where they will come in contact with the colliding vehicle. In FIG. 12 an impact between two of Applicant's vehicles is depicted. The low nose of the vehicle gets under the body of the other vehicle and lifts it, which may roll it over depending on where on the side it is hit. The main chassis beam 1 is positioned to absorb the impact of the colliding vehicle without damage to the frame.

Figure 2:
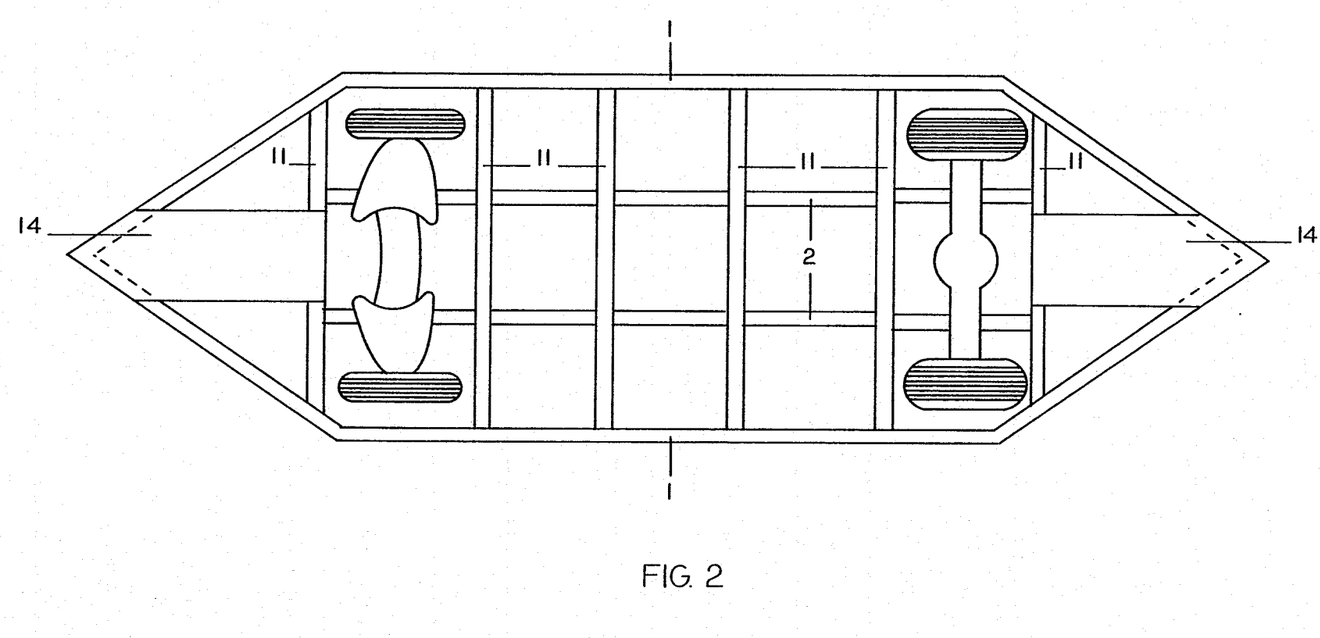
FIG. 2 is a bottom view of the car.
Figure 2:
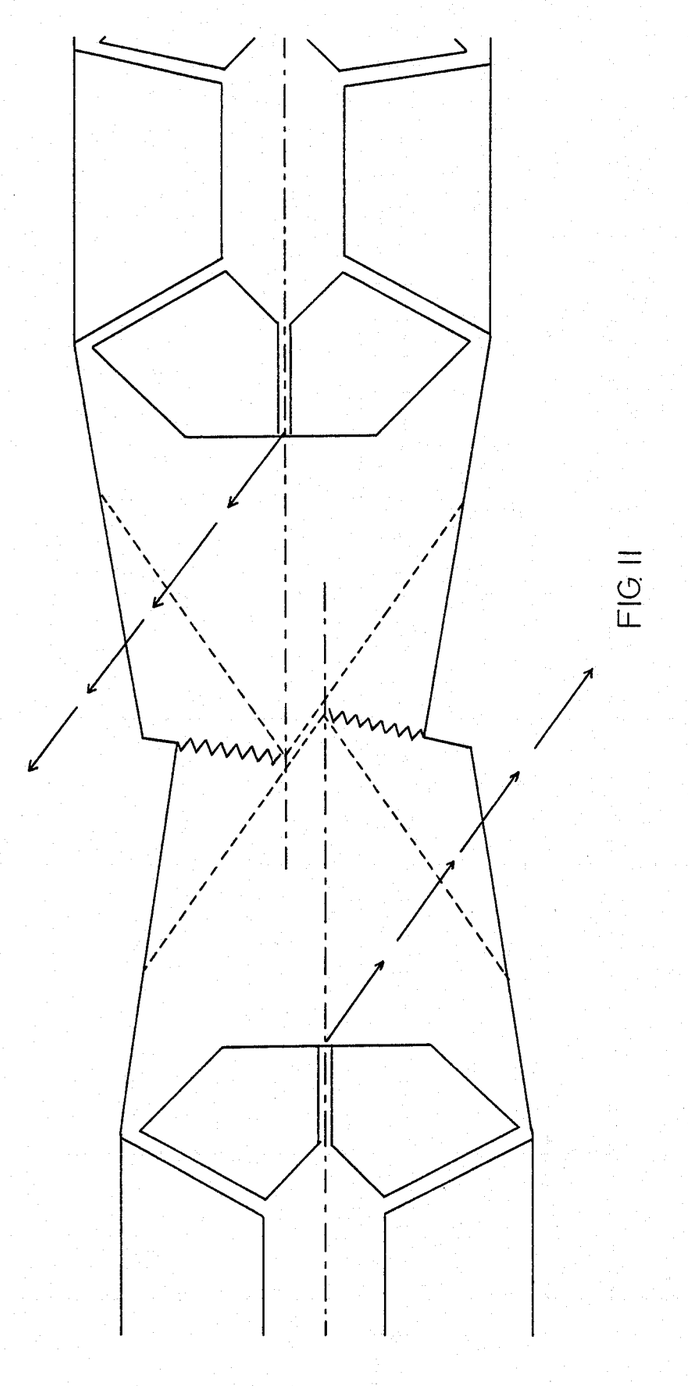
Figure 10:
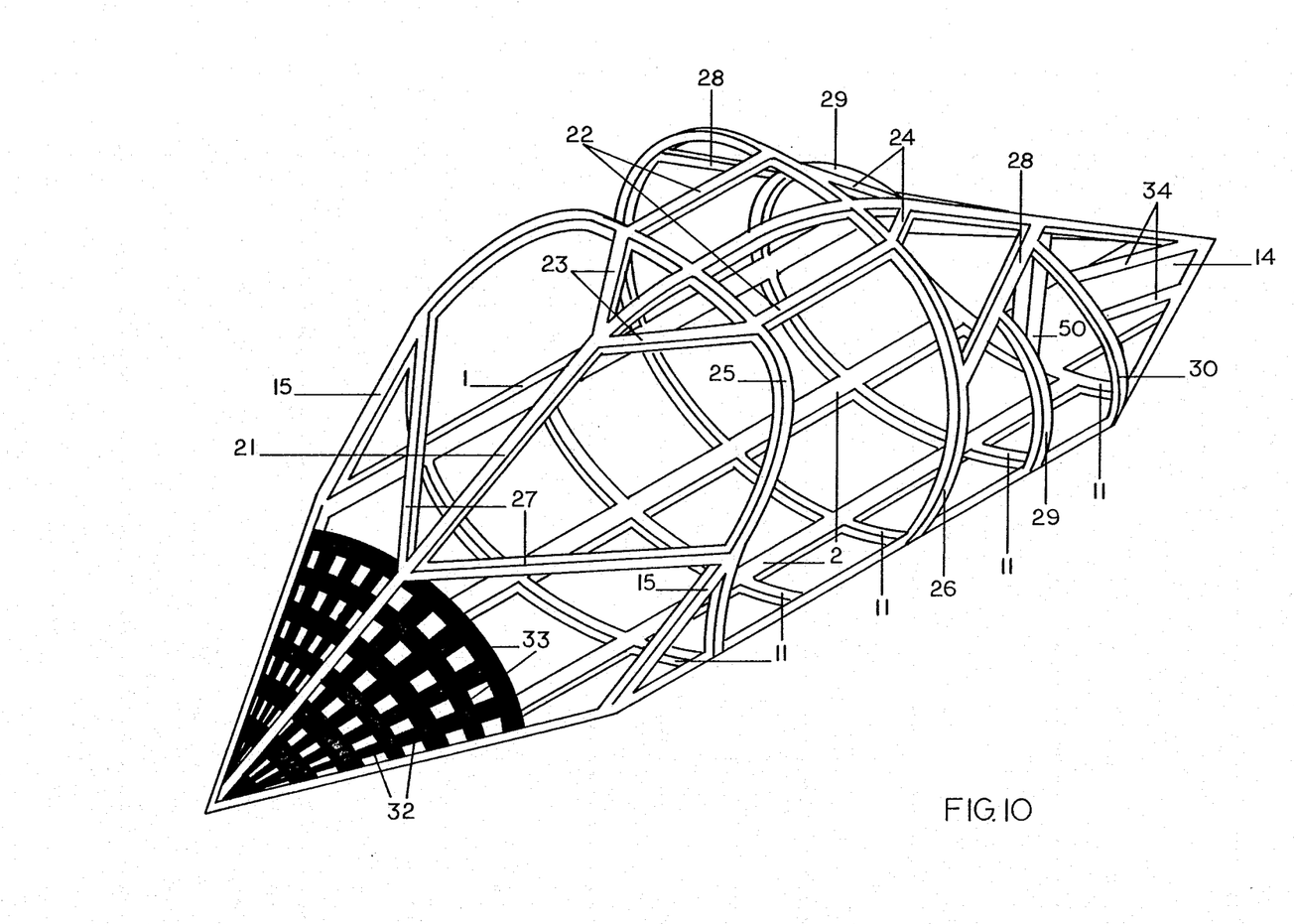
FIG. 10 is a perspective view of the car frame.

The floor beams 2, see FIGS. 1, 2 and 10, are used to reinforce the vehicle. By attaching cross beams 11 to floor beams 2 and main chassis beams 1 the frame is made sturdy and able to absorb impacts which will move the whole vehicle without damaging the frame.

Figure 3:
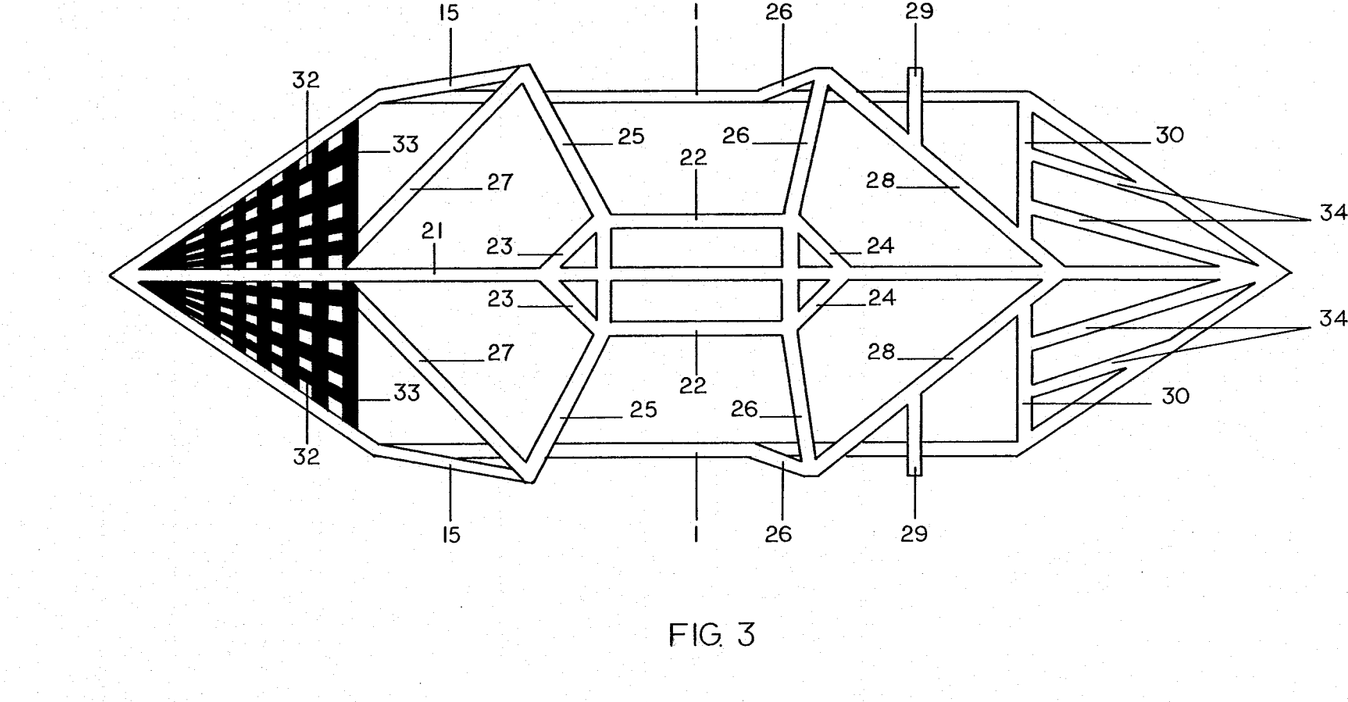
FIG. 3 is a top view of the car.

The roof beams 22 and center beam 21 reinforce the roof, see FIG. 3. The roof will be able to withstand the force of roll overs and the vehicle resting on its roof without damaging the roof.

Many of the frame members such as the rear main beam 26 and cross beams 11 are curved to give the vehicle its oval shape.

FIG. 2 shows a bottom view of the invention. The main chassis beams 1 extend from the tip of the front to the tip of the back of the vehicle. They are parallel along the main body section and converge along the cone's sides to points at the front and rear of the vehicle. Cross beams 11 and floor beams 2 give the body strength. There are skid plates 14 at the front and rear of the vehicle. The skid plate is designed to slide on the ground when either the front or back of the vehicle is forced down. This will occur when the nose or tail of the vehicle is lifting another vehicle. The skid plate will allow the vehicle to slide on the skid plate rather than dig into the ground which would cause a sudden stop. The skid plate also helps prevent damage to the vehicles body.

The propulsion mechanism generally referred to as the wheels, axles, transmission, differential, engine and other parts as shown generally in FIG. 2 are attached to the frame.

Figure 8:
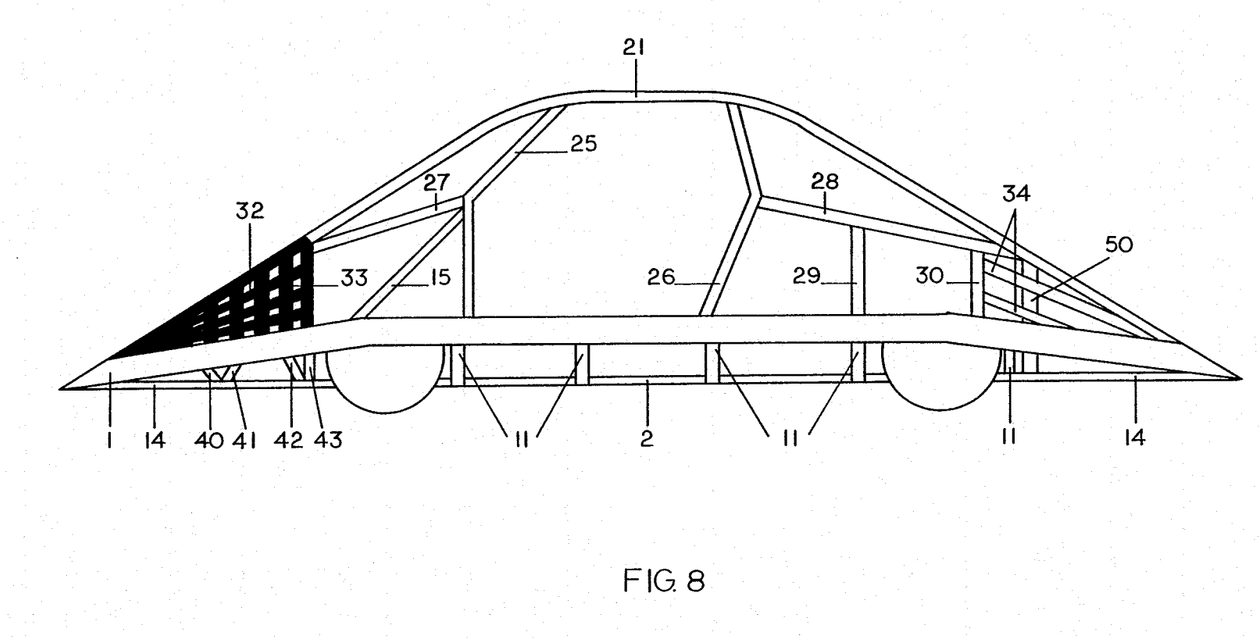
FIG. 8 is a side view of the car frame.
Figure 9:
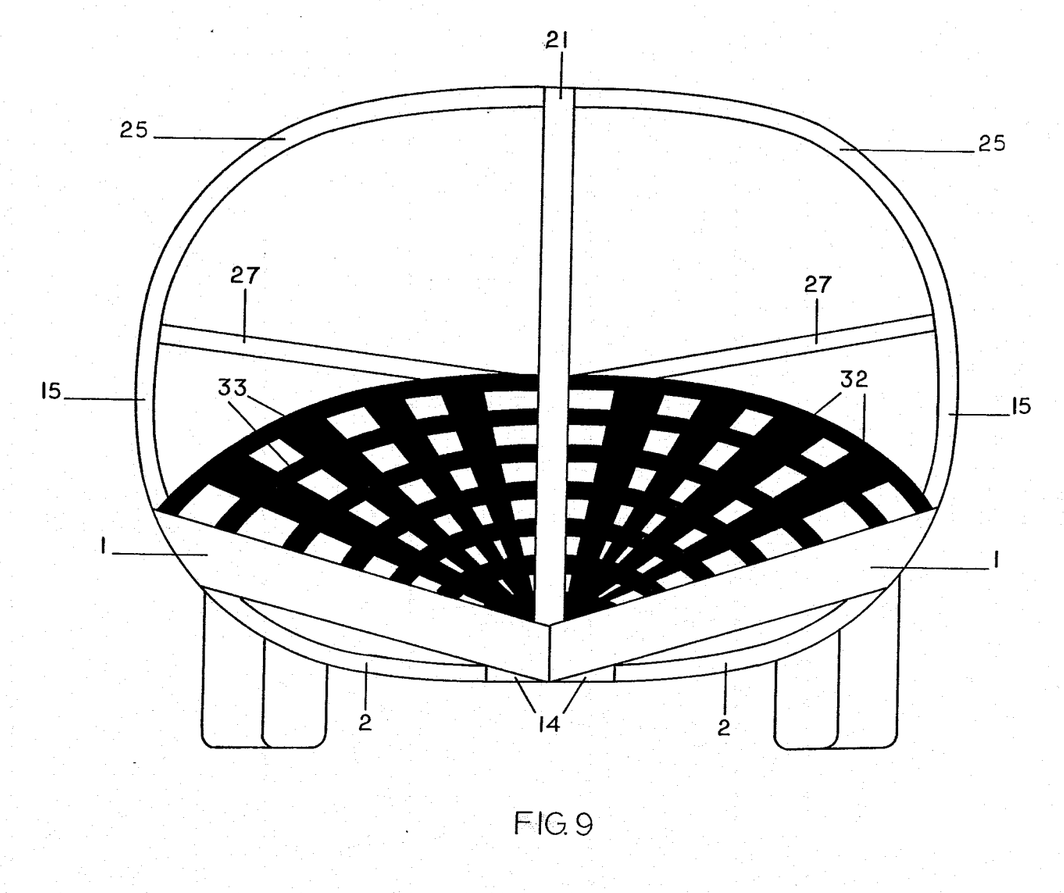
FIG. 9 is a front view of the car frame.

FIG. 3 shows a top view of the vehicle. It shows the center beam 21 which extends from the front tip to the rear tip of the vehicle. The center beam is made strong enough to lift another vehicle which may be resting on it during an accident. As seen in FIGS. 8 and 12 the nose and tail of the vehicle is low enough to get under the frame of another vehicle, especially a conventional vehicle. In a crash the nose or tail would get under and lift the other vehicle. When lifting the other vehicle the frame must be strong enough to support the other vehicle without damage to the frame. In this way the energy of the colliding vehicles is dissipated by one vehicle lifting the other. This prevents a quick deacceleration and the associated crunching of metal of a typical crash and protects the passengers.

Roof beams 22 support the door hinges for a gull wing door and provide strength for the roof. The gull wing door fits in between the front roll beam 25 and the rear roll beam 26. For safety it is preferred to have bolts lock from the door into the front and rear roll beams so that the doors will not open during a collision which could cause injuries to the passengers.

Front roof beams 23 and rear roof beams 24 help reinforce the roof of the vehicle and help hold the vehicles windows in place.

Front roll beam 25 and rear roll beam 26 both extend from one main chassis beam to the other in an arc (see FIGS. 1 and 10). The roll beams 25 and 26 are curved so that the vehicle's shape is rounded which will promote rollovers with little damage in the event of a collision. The energy of a collision can then be absorbed by the vehicle rolling over rather than being crushed, thus saving the occupants from injury or death. The roll beams must be strong enough to support the car while it is rolling over and to withstand the impact from another car without damage to the vehicle. The roll beams 25 and 26 are spaced to define the door of the vehicle which is placed between the roll beams. Roll beams 25 and 26 are preferably strong enough to support the vehicle while lying on its roof without damaging the vehicle. The roll beams are also preferably strong enough to support the weight of another vehicle should it be lifted to the roof of the vehicle during a collision.

Front window beam 27 and rear window beam 28 define the lower portion of the windows. The front window beams 27 support the front windows and help reinforce the frame by running from the center beam 21 to the front roll beam 25. The rear window beams 28 support the rear windows and help reinforce the frame by running from the center beam 21 to the rear roll beam 26.

The rear window roll bars 29 and the trunk roll bars 30 extend from the main chassis beams 1 to the rear window beams 28. The roll bars 29 and 30 are to reinforce the frame and to help absorb impacts on the side of the vehicle.

Rear cone ribs 34 protect the rear of the vehicle from rear end collisions. The rear of the vehicle will get under the frame of the other vehicle and the other vehicle will ride up on the rear cone ribs 34 and the center beam 21.

The front of the vehicle has front cone ribs 32 and front cone cross ribs 33 for extra protection when the vehicle hits another vehicle. The cone will protect the front end of the vehicle no matter what part of the the other car is hit. Depending on what part of the other car is hit the vehicle will lift the other car up and over the center, right or left of the nose of the vehicle depending on where the center of gravity of the car that is lifted is. Since it is anticipated that the most protection is needed for the front of the vehicle, the front is reinforced more than the rear.

Figure 4:
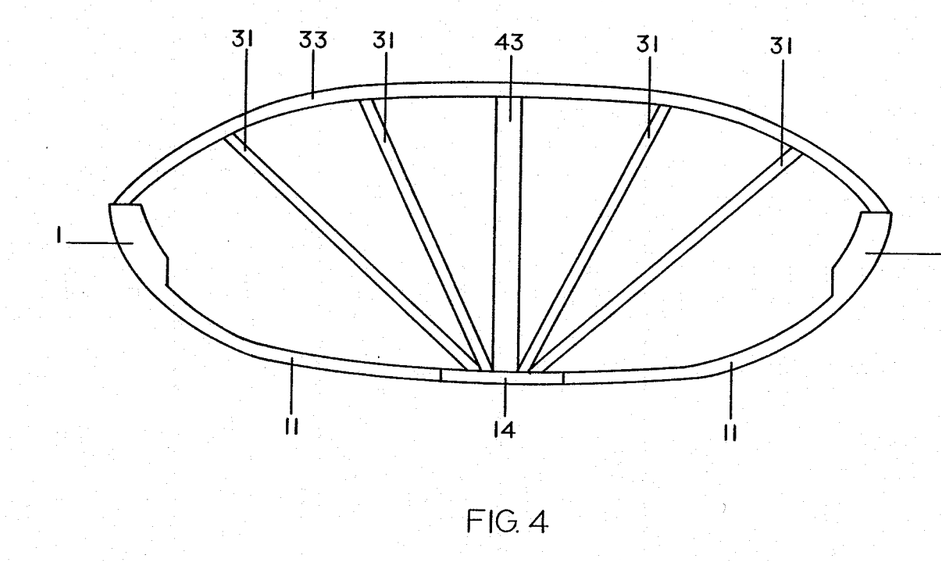
FIG. 4 is a is a front cross sectional view of the car.

FIG. 4 is a front cross section view of the front of the vehicle. It shows the skid plate 14 on the bottom of the vehicle, cross beams 11, main chassis beams 1, the 4th center cross brace 43, the rear most of the front cone cross ribs 33 and support braces 31 for strengthening the rear most front cone cross rib 33.

Figure 5:
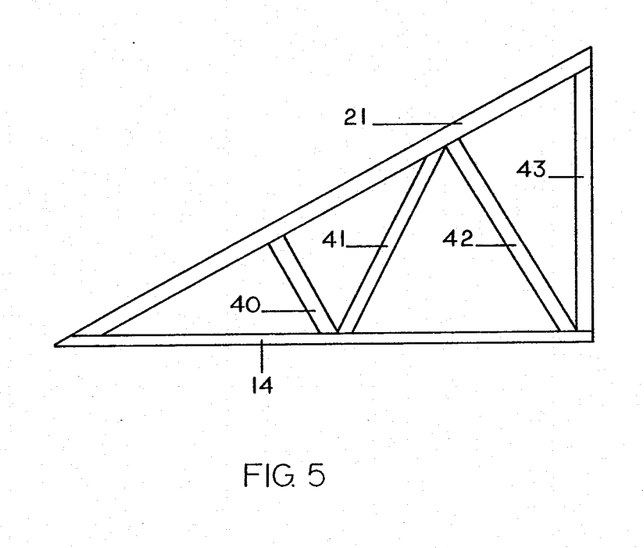
FIG. 5 is a side view of the center front cone stucture of the car.

FIG. 5 shows a side view of the reinforcement of the front cone. It shows the skid plate 14, the center beam 21 and the cross braces 40, 41, 42 and 43 that reinforce them.

Figure 6:
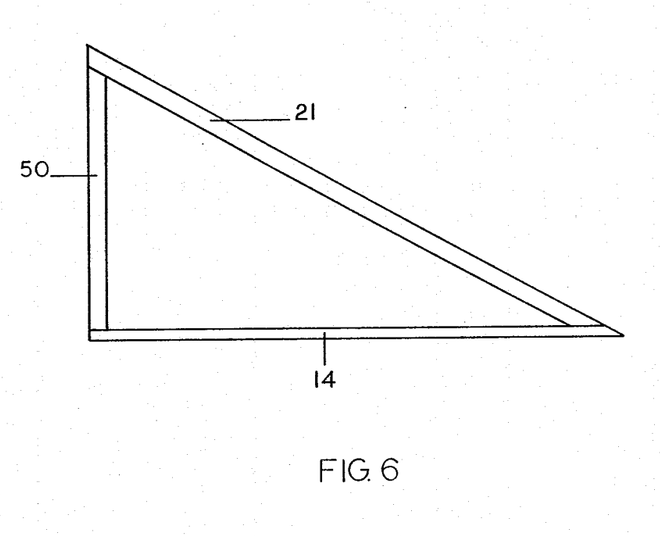
FIG. 6 is a side view of the center rear cone structure of the car.

FIG. 6 is a side view of the rear cone of the vehicle. It is less protected than the front cone. It only has one center brace 50.

Figure 7:
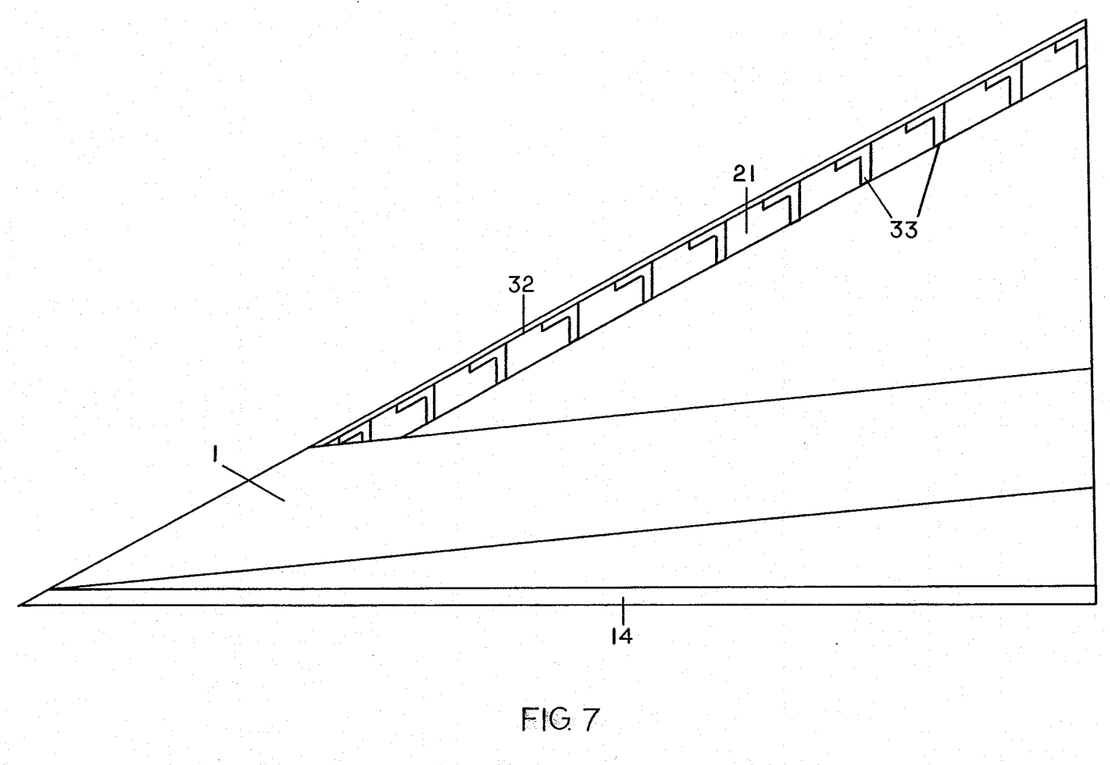
FIG. 7 is a close-up side view of the center front cone structure showing the curved angle cross ribs.

FIG. 7 is a closeup side view of the front cone of the vehicle. It shows skid plate 14, the front cone ribs 32, main chassis beam 1, and a side cross sectional view of the front cone cross ribs 33, which are preferably curved and have an angle. The cross ribs 33 are attached to the sides of the center beam 21 and extend to the main chassis beams 1.

FIG. 8 shows a side view of the vehicle. It shows the main chassis beam 1, the front cone ribs 32, the front cone cross ribs 33, the bottoms of the center cross braces 40, 41, 42, and 43 which provide support to the center beam of the vehicle and reinforces the cone which is important in the event of front end collisions. The figure also shows center beam 21 which runs the length of the vehicle.

The center beam 21 and the main chassis beam 1 meet at a point in the front and at the back of the vehicle. The point is low to the ground so that if the vehicle hits another car the vehicle will lift the other car off the ground by the front of the vehicle getting under the frame of the other car and lifting it rather than impacting it and crushing it. Thus the force of the collision is dissipated in lifting the other car rather than in smashing into it. The cone is reinforced all around at the front of the vehicle so that it can lift the other car along any part of the cone without damaging the frame of the vehicle. The front of the vehicle can hit the side, front or rear of another vehicle with a conventional box type design and lift it off the ground rather than smash into it.

When two vehicles of this design hit straight on the vehicles will glance off of one another or go under or over the other vehicle depending on the initial point of contact, because the frames of the vehicles both come to a point.

If a conventional car hits the vehicle from the side the front of the other vehicle will hit the frame of the invention on the curved portion of the side at the main chassis beam. The curve will tend to force the other vehicle down and raise the side of the invention.

The frame of the invented vehicle has main chassis beams 1, front and rear roll beams 25 and 26 rear window roll bar 29, trunk roll bar 30, front support beam 15, front and rear window beams 27 and 28 and cross beams 11 all of which connected together form a strong frame which will not collapse on impact and thus the frame protects the passengers.

FIG. 10 shows how all the parts of the frame interconnect to spread the stress of a collision among the frame members and how they all reinforce one another.

It is preferred to have hinges on the front window beam 27 and on the center beam 21 and a latch on the center beam to allow for a hood which will give access to the engine compartment to install or repair the engine.

It is also preferred to have hinges on the rear window beam and the center beam, and a latch on the center beam to provide access to a trunk.

Figure 14:
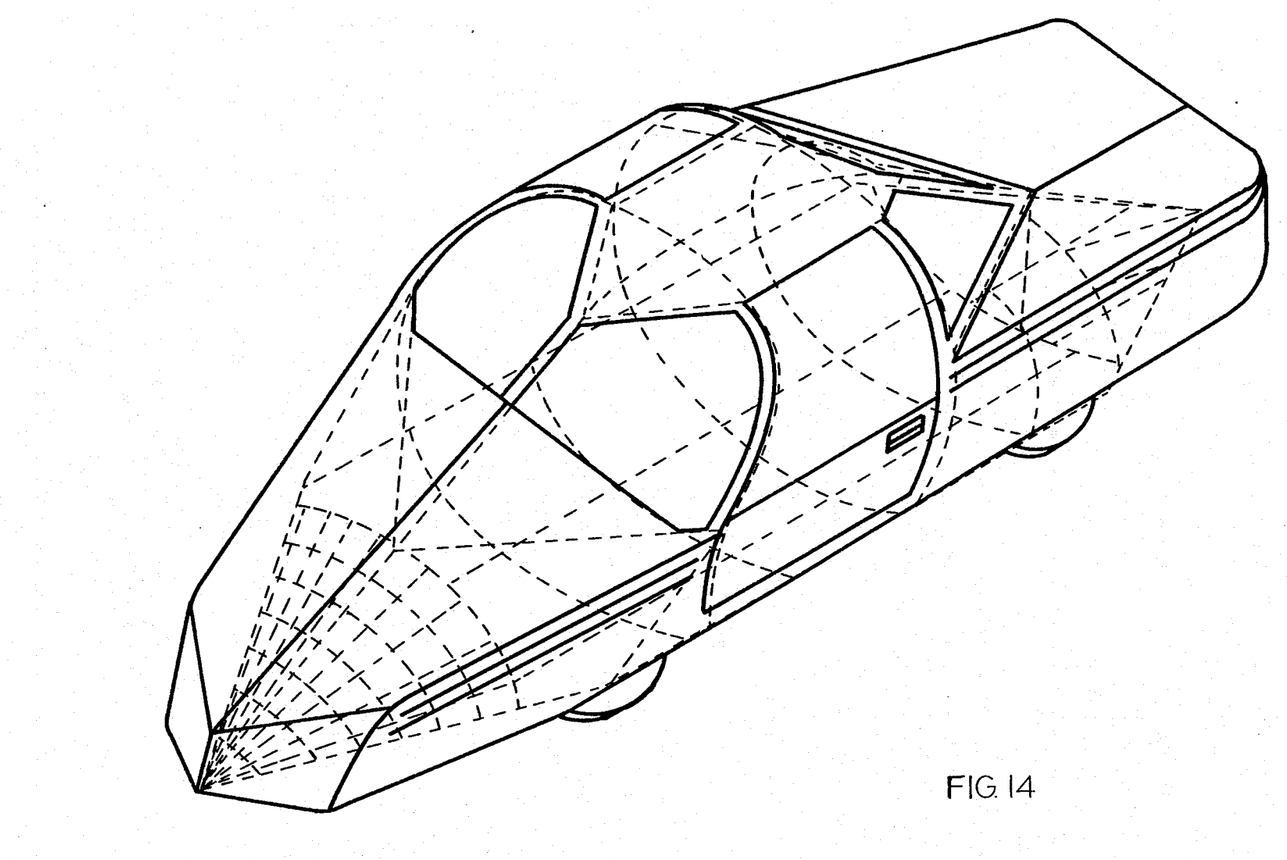
FIG. 14 is a perspective view of the car frame with breakaway body parts.

In order to improve the look of the vehicle to conform to accepted styles, see FIG. 14, the use of break away body parts is preferred. The body parts would be attached to give the vehicle a desired look but would become detached easily in the event of a collision to reveal the frame elements which can lift the other vehicle, promote a glancing type collision or absorb a side impact or roll the vehicle depending on the type of vehicle and the type of collision in the accident.

It is preferred to make the inside of the vehicle padded to help prevent injuries in case of a collision.

The inventor prefers the use of joystick steering to eliminate the steering wheel which the driver may come in contact with during a collision causing injuries.

The inventor also proposes to use a strong safety glass for the windows to help prevent injuries from flying glass.

While a complete detailed specification has been recited above, it is understood that the invention is not so limited to the specific configuration of frame elements disclosed.

I claim:

1. A crashable vehicle frame consisting of:

a main body section having frame members defining a top, a bottom and sides of the vehicle, and having an oval longitudinal cross section, the main body section has a front and a rear, a front and a rear cone attached to the main body section, each cone having a half cone shape, one cone coming to a point in the front of the vehicle and one cone coming to a point at the rear of the vehicle, the vehicle has a width having a center, the front and rear cones having a point and a base, the point of the front and rear cones are at the center of the vehicles width, a skid plate on the bottom of the frame extending from the point of the cones to the base of the cones, the skid plate helps the vehicle to slide on the ground should there be a collision where the cone lifts another vehicle and the bottom of the cone is forced onto the ground, the main chassis beams running the length of the vehicle, the main chassis beams are parallel to each other in the main body section and converge to a point in the cone shaped front and rear sections, the main chassis beams are positioned on either side of the vehicle at a height so that it will make contact with and absorb the shock of a collision with another vehicle, a center beam running from the point of the front cone sloping upward to a roof, running through the center of the roof and then sloping down to the point on the rear cone, a plurality of cross beams extending between the main chassis beams on the bottom of the vehicle, and two floor beams extending the length of the main body section, located between the main chassis beams and attached to the cross beams to give the vehicle frame strength, the front cone has a plurality of ribs running from the main chassis beams up to the center beam to reinforce the front cone, there are a plurality of cross ribs which run from the point of the cone to the rear most rib to further reinforce the front cone, and a series of center cross braces running from the skid plate to the center beam to reinforce the center beam so that it has the strength to lift another vehicle in the event of a collision, to further strengthen the vehicle two front window beams extend from a point on the center beam forming a V shape and attach to a front roll beam, a front support beam extends upward from the main chassis beam to the juncture of the front window beam and the front roll beam for additional support and to spread the stress caused by collisions a front roll beam and a rear roll beam which extend from one main chassis beam to the other, the front and rear roll beams are curved so as to give the vehicle its oval shape, two roof beams extend between the front and rear roll beams at the top of the vehicle frame to help define and support the roof of the vehicle, the roof beams run parallel to the center beam one roof beam on each side of the center beam, two front roof beams extending from a point on the center beam forming a V shape and attached to the front roll beam, to strengthen the roof of the vehicle, two rear roof beams extending from a point on the center beam forming a V shape and attaching to the rear roll beam, to strengthen the roof of the vehicle, the front and rear roll beams define the opening for a door on each side of the vehicle, the rear cone has a plurality of ribs extending from the main chassis beams to one of two trunk roll bars, the ribs running parallel to the center beam, so that in the event of another vehicle striking said frame at the rear the other vehicle can be lifted up and supported on the rear cone, the rear cone also has two rear window roll bars, two rear window beams and a center brace, the center brace extends from the rear cone's skid plate to the center beam to reinforce the rear cone structure, the rear window beams extend from the juncture of the center beam and center brace to the rear roll beam forming a V shape, and attach to a rear roll beam, the trunk roll bars and the rear window roll bars extend from the main chassis beam to the rear window beams, to reinforce the rear of the vehicle.

* * * * *